US012779773B2

(12) United States Patent
Newell

(10) Patent No.: US 12,779,773 B2
(45) Date of Patent: Nov. 3, 2026

(54) BRAIDED COMINGLED TOW FILAMENT FOR USE IN 3D PRINTING

(71) Applicant: Stratsys, Inc., Eden Prairie, MN (US)

(72) Inventor: Clint Newell, Chandler, AZ (US)

(73) Assignee: Stratasys, Inc., Minnetonka, MN (US)

(*) Notice: Subject to any disclaimer, the term of this patent is extended or adjusted under 35 U.S.C. 154(b) by 41 days.

(21) Appl. No.: 18/178,645

(22) Filed: Mar. 6, 2023

(65) Prior Publication Data

US 2023/0202097 A1 Jun. 29, 2023

Related U.S. Application Data

(63) Continuation of application No. 16/843,025, filed on Apr. 8, 2020, now abandoned.

(Continued)

(51) Int. Cl.

*B29C 67/00* (2017.01)
*B29B 11/10* (2006.01)

(Continued)

(52) U.S. Cl.

CPC ............ *B29C 64/118* (2017.08); *B29B 11/10* (2013.01); *B29C 64/307* (2017.08); *B33Y 10/00* (2014.12);

(Continued)

(58) Field of Classification Search

CPC .. D02G 3/22; D02G 3/36; D02G 3/40; D02G 3/402; D02G 3/404; D02G 3/406

See application file for complete search history.

(56) References Cited

U.S. PATENT DOCUMENTS 5,503,785 A 4/1996 Crump et al.
5,866,058 A 2/1999 Batchelder et al.

(Continued)

FOREIGN PATENT DOCUMENTS

JP 2013213305 A * 10/2013 ............... D02G 3/38
WO 2015037574 A1 3/2015

(Continued)

OTHER PUBLICATIONS

International Search Report and Written Opinion from PCT/US2019/059676, filed Nov. 4, 2019. 12 pages.

(Continued)

*Primary Examiner* — Ryan M Ochylski

(74) *Attorney, Agent, or Firm* — Westman, Champlin & Koehler, P.A.

(57) ABSTRACT

A feedstock configured for use in an extruder in an additive manufacturing system is configured as a braided comingled tow filament. A method of producing the braided comingled tow filament includes providing a bundle of comingled tow material having a fiber count ranging from about 1,000 fibers to about 25,000 fibers having thermoplastic fibers comingled therewith, wherein the tow material in the filament ranges from about 50 to 75 volume percent and the volume percent of the thermoplastic material ranges from about 25 volume percent to about 50 volume percent. The method includes dividing the length of comingled tow material into sections, twisting each section into a strand to form a plurality of strands of twisted tow material, and braiding together the strands.

19 Claims, 5 Drawing Sheets

Related U.S. Application Data

(60) Provisional application No. 62/832,015, filed on Apr. 10, 2019.

(51) Int. Cl.

| | |
|---|---|
| ***B29C 64/118*** | (2017.01) |
| ***B29C 64/307*** | (2017.01) |
| ***B33Y 10/00*** | (2015.01) |
| ***B33Y 70/10*** | (2020.01) |
| *B29K 101/12* | (2006.01) |
| *B29K 105/10* | (2006.01) |

(52) U.S. Cl.

CPC .......... *B33Y 70/10* (2020.01); *B29K 2101/12* (2013.01); *B29K 2105/106* (2013.01)

(56) References Cited

U.S. PATENT DOCUMENTS

| | | | | |
|---|---|---|---|---|
| 5,936,861 | A | 8/1999 | Jang et al. | |
| 6,004,124 | A | 12/1999 | Swanson et al. | |
| 6,054,077 | A | 4/2000 | Comb et al. | |
| 6,547,995 | B1 | 4/2003 | Comb | |
| 6,814,907 | B1 | 11/2004 | Comb | |
| 6,923,634 | B2 | 8/2005 | Swanson et al. | |
| 6,934,600 | B2 | 8/2005 | Jang et al. | |
| 7,122,246 | B2 | 10/2006 | Comb et al. | |
| 7,384,255 | B2 | 6/2008 | LaBossiere et al. | |
| 7,491,356 | B2 | 2/2009 | Heikkila | |
| 7,604,470 | B2 | 10/2009 | LaBossiere et al. | |
| 7,625,200 | B2 | 12/2009 | Leavitt | |
| 7,896,209 | B2 | 3/2011 | Batchelder et al. | |
| 8,153,182 | B2 | 4/2012 | Comb et al. | |
| 8,419,996 | B2 | 4/2013 | Swanson et al. | |
| 8,647,102 | B2 | 2/2014 | Swanson et al. | |
| 8,919,410 | B2 | 12/2014 | Kappesser et al. | |
| 8,926,882 | B2 | 1/2015 | Batchelder et al. | |
| 9,126,365 | B1 | 9/2015 | Mark et al. | |
| 9,126,367 | B1 | 9/2015 | Mark et al. | |
| 9,149,988 | B2 | 10/2015 | Mark et al. | |
| 9,156,205 | B2 | 10/2015 | Mark et al. | |
| 9,186,846 | B1 | 11/2015 | Mark et al. | |
| 9,186,848 | B2 | 11/2015 | Mark et al. | |
| 9,364,986 | B1 | 6/2016 | Patterson | |
| 9,511,543 | B2 | 12/2016 | Tyler | |
| 9,579,851 | B2 | 2/2017 | Mark et al. | |
| 9,593,238 | B2 | 3/2017 | Arai et al. | |
| 9,688,028 | B2 | 6/2017 | Mark et al. | |
| 9,770,876 | B2 | 9/2017 | Farmer et al. | |
| 9,815,268 | B2 | 11/2017 | Mark et al. | |
| 9,931,778 | B2 | 4/2018 | Bogucki et al. | |
| 9,956,725 | B2 | 5/2018 | Mark et al. | |
| 10,011,922 | B2 | 7/2018 | Graley et al. | |
| 10,081,129 | B1 | 9/2018 | Alvarado et al. | |
| 10,105,893 | B1 | 10/2018 | Wilenski et al. | |
| 10,179,853 | B2 | 1/2019 | Naito et al. | |
| 10,428,164 | B2 | 10/2019 | Wang et al. | |
| 10,457,033 | B2 | 10/2019 | Wilenski et al. | |
| 10,563,324 | B2 | 2/2020 | Graley et al. | |
| 11,207,831 | B2 | 12/2021 | Lewis et al. | |
| 11,643,754 | B2 | 5/2023 | Graley et al. | |
| 2009/0274540 | A1 | 11/2009 | Batchelder et al. | |
| 2010/0096485 | A1 | 4/2010 | Taatjes et al. | |
| 2010/0096489 | A1 | 4/2010 | Taatjes et al. | |
| 2012/0070619 | A1 | 3/2012 | Mikulak et al. | |
| 2012/0231225 | A1 | 9/2012 | Mikulak et al. | |
| 2013/0252497 | A1 | 9/2013 | Schiebel et al. | |
| 2014/0361460 | A1 | 12/2014 | Mark | |
| 2015/0284886 | A1* | 10/2015 | Ohtani | C08J 5/04 428/375 |
| 2016/0002468 | A1 | 1/2016 | Heikkila et al. | |
| 2016/0024293 | A1 | 1/2016 | Nestle et al. | |
| 2016/0082658 | A1 | 3/2016 | Swartz et al. | |
| 2016/0082659 | A1 | 3/2016 | Hickman et al. | |
| 2016/0122541 | A1 | 5/2016 | Jaker et al. | |
| 2016/0136887 | A1 | 5/2016 | Guillemette et al. | |
| 2016/0177078 | A1 | 6/2016 | Naito et al. | |
| 2017/0100855 | A1 | 4/2017 | Taylor | |
| 2017/0268133 | A1 | 9/2017 | Graley et al. | |
| 2018/0043627 | A1 | 2/2018 | Barclay et al. | |
| 2018/0202076 | A1 | 7/2018 | Van Der Schaaf et al. | |
| 2020/0061934 | A1* | 2/2020 | Rudolph | D04C 1/06 |
| 2020/0207030 | A1 | 7/2020 | Mishima et al. | |
| 2021/0387402 | A1 | 12/2021 | Swanson | |

FOREIGN PATENT DOCUMENTS

| | | | |
|---|---|---|---|
| WO | 2015121586 | A2 | 8/2015 |
| WO | 2017112689 | A1 | 6/2017 |
| WO | 2018075320 | A1 | 4/2018 |
| WO | 2018106705 | A1 | 6/2018 |
| WO | 2018108639 | A1 | 6/2018 |
| WO | 2018112263 | A1 | 6/2018 |
| WO | 2018162268 | A1 | 9/2018 |
| WO | 2019025472 | A1 | 2/2019 |
| WO | 2020093049 | A1 | 5/2020 |

OTHER PUBLICATIONS https://www.amazon.com/Essentium-Flexible-Filament-1-75mm-Print/dp/B06W5DQ8ST.

US Prosecution history from U.S. Appl. No. 16/843,025, filed Apr. 8, 2020 including: Final Rejection mailed Nov. 4, 2022, and Non-Final Rejection mailed May 4, 2022.

Prosecution History from corresponding U.S. Appl. No. 16/843,025, filed Apr. 8, 2020 including: Final Rejection mailed Nov. 4, 2022, Non-Final Rejection mailed Oct. 19, 2023; and Final Rejection mailed Mar. 14, 2024.

https://www.fabbaloo.com/blog/2018/7/30/has-essentium-solved-the-flexible-3d-printing-problem.

* cited by examiner

BRAIDED COMINGLED TOW FILAMENT FOR USE IN 3D PRINTING

CROSS REFERENCE TO RELATED APPLICATION(S)

The present Application is a continuation of U.S. patent application Ser. No. 16/843,025, filed Apr. 8, 2020, which claims the benefit to U.S. Provisional Patent Application Ser. No. 62/832,015 that was filed on Apr. 10, 2019 and entitled BRAIDED COMINGLED TOW FILAMENT FOR USE IN 3D PRINTING, the contents of which are incorporated by reference in their entirety.

BACKGROUND

The present disclosure relates to consumable materials for additive manufacturing materials and techniques for printing parts with the materials. In particular, the present disclosure relates to feedstocks with having a continuous fiber reinforcement for use in additive manufacturing, methods of forming the feedstocks and methods of print parts with an extrusion based additive manufacturing system utilizing the feedstock.

Additive manufacturing, also called 3D printing, is generally a process in which a part is built by adding material to form the part rather than subtracting material as in traditional machining. Using one or more additive manufacturing techniques, a three-dimensional solid part of virtually any shape can be printed from a digital model of the part by an additive manufacturing system, commonly referred to as a 3D printer. A typical additive manufacturing work flow includes slicing a three-dimensional computer model into thin cross sections defining a series of layers, translating the result into two-dimensional position data, and transmitting the data to a 3D printer which manufactures a 3D part in an additive build style. Additive manufacturing entails many different approaches to the method of fabrication, including material extrusion, ink jetting, selective laser sintering, powder/binder jetting, electron-beam melting, electrophotographic imaging, and stereolithographic processes.

In a typical extrusion-based additive manufacturing system (e.g., fused deposition modeling systems developed by Stratasys, Inc., Eden Prairie, MN), a 3D part may be printed from a digital representation of the printed part by extruding a viscous, flowable thermoplastic or thermoplastic material filled with lengths of individual fibers from a print head along toolpaths at a controlled extrusion rate. The extruded flow of material is deposited as a sequence of roads onto a substrate, where it fuses to previously deposited material and solidifies upon a drop in temperature. The print head includes a liquefier which receives a supply of the thermoplastic material in the form of a flexible filament, and a nozzle tip for dispensing molten material. A filament drive mechanism engages the filament such as with a drive wheel and a bearing surface, or pair of toothed-wheels, and feeds the filament into the liquefier where the filament is heated to a molten pool. The unmelted portion of the filament essentially fills the diameter of the liquefier tube, providing a plug-flow type pumping action to extrude the molten filament material further downstream in the liquefier, from the tip to print a part, to form a continuous flow or toolpath of resin material. The extrusion rate is unthrottled and is based only on the feed rate of filament into the liquefier, and the filament is advanced at a feed rate calculated to achieve a targeted extrusion rate, such as is disclosed in Comb U.S. Pat. No. 6,547,995.

In a system where the material is deposited in planar layers, the position of the print head relative to the substrate is incremented along an axis (perpendicular to the build plane) after each layer is formed, and the process is then repeated to form a printed part resembling the digital representation. In fabricating printed parts by depositing layers of a part material, supporting layers or structures are typically built underneath overhanging portions or in cavities of printed parts under construction, which are not supported by the part material itself. A support structure may be built utilizing the same deposition techniques by which the part material is deposited. A host computer generates additional geometry acting as a support structure for the overhanging or free-space segments of the printed part being formed. Support material is then deposited pursuant to the generated geometry during the printing process. The support material adheres to the part material during fabrication and is removable from the completed printed part when the printing process is complete.

A multi-axis additive manufacturing system may be utilized to print 3D parts using fused deposition modeling techniques. The multi-axis system may include a robotic arm movable in six degrees of freedom. The multi-axis system may also include a build platform movable in two or more degrees of freedom and independent of the movement of the robotic arm to position the 3D part being built to counteract effects of gravity based upon part geometry. An extruder may be mounted at an end of the robotic arm and may be configured to extrude material with a plurality of flow rates, wherein movement of the robotic arm and the build platform are synchronized with the flow rate of the extruded material to build the 3D part. The multiple axes of motion can utilize complex tool paths for printing 3D parts, including single continuous 3D tool paths for up to an entire part, or multiple 3D tool paths configured to build a single part. Use of 3D tool paths can reduce issues with traditional planar toolpath 3D printing, such as stair-stepping (layer aliasing), seams, the requirement for supports, and the like. Without a requirement to slice a part to be built into multiple layers each printed in the same build plane, the geometry of the part may be used to determine the orientation of printing.

Fused deposition modeling technologies can be utilized to fabricate continuous fiber composite parts, such as is disclosed in Jang U.S. Pat. Nos. 5,936,891 and 6,934,600. In general, feedstock materials for printing continuous fiber composite parts mix a fiber tow with a polymer matrix material. A polymer melt may be combined with a fiber tow in situ (e.g., in the extruder), may be prefabricated in a unitary constructed feedstock to be fed to a 3D printer, or combinations thereof.

SUMMARY

An aspect of the present disclosure relates to a method of producing a feedstock configured for use in an extruder in an additive manufacturing system. The method includes providing a length of comingled tow material having a fiber density ranging from about 1,000 fibers to about 25,000 fibers having thermoplastic fibers comingled therewith, wherein the tow material in the filament ranges from about 50 to 75 volume percent and the volume percent of the thermoplastic material ranges from about 25 volume percent to about 50 volume percent. The method includes dividing the length of comingled tow material into sections, twisting each section into a strand to form a plurality of strands of twisted tow material.

Another aspect of the present disclosure relates to a method of printing a part with an extrusion based additive manufacturing system. The method includes providing a filament of braided tow material having a fiber density ranging from about 1,000 fibers to about 25,000 fibers having thermoplastic fibers comingled therewith, wherein the tow material in the filament ranges from about 50 to 75 volume percent and the volume percent of the thermoplastic material ranges from about 25 volume percent to about 50 volume percent and heating the thermoplastic material within the filament to a flowing or melted state. The method includes extruding the filament along a first tool path to form at least a portion of the part wherein the thermoplastic material bonds to the tow material and provides a sufficient amount of thermoplastic material on a surface of the extruded filament such that layers of the filament bond to each other to print at least a portion of the part.

Another aspect of the present disclosure relates to a filament for use in an extrusion based additive manufacturing system, where the filament has a longitudinal axis. The filament includes braided tow material having a fiber density ranging from about 1,000 fibers to about 25,000 fibers having thermoplastic fibers comingled therewith, wherein the comingled tow material in the filament ranges from about 50 to 75 volume percent and the volume percent of the thermoplastic material ranges from about 25 volume percent to about 50 volume percent.

Another aspect of the present disclosure includes a method of producing a feedstock configured for use in an extruder in an additive manufacturing system. The method includes providing a plurality of bundles of comingled tow material, at least two of the bundles being different materials, each bundle having a fiber density ranging from about 1,000 fibers to about 25,000 fibers having thermoplastic fibers comingled therewith, wherein the tow material in the filament ranges from about 50 to 75 volume percent and the volume percent of the thermoplastic material ranges from about 25 volume percent to about 50 volume percent. The method includes dividing each bundle of comingled tow material into sections, twisting each section into a strand to form a plurality of strands of twisted tow material, and braiding together the plurality of strands of tow material to form a braided tow filament for use in the additive manufacturing system.

Definitions

Unless otherwise specified, the following terms used in this specification have the meanings provided below.

The term "filament" refers to a consumable feedstock for use in an additive manufacturing system that is configured to be fed into a liquefier, print head or extruder of the additive manufacturing system. The filament has an axis along its length, an elastic modulus that permits deformation along the axis, and can be of any suitable form including any coiled or spooled form, including having a substantially circular or rectangular cross-section taken normal to the axis and/or having a cross-section having an aspect ratio greater than or equal to 1:1 taken normal to the axis, and including core-shell configurations.

The term "extruder" refers to any device that is carried by an additive manufacturing system that is capable of accepting a filament and heating the filament to a temperature where amorphous polymers flow and/or semi-crystalline polymers melt. The extruder can include a heated liquefier tube or channel, a heated screw extruder that process the filament, and/or other heated pumping mechanisms.

The terms "core portion", "shell portion", "shell" and "core" of a filament refer to relative locations of the portions along a cross-section of the filament that is orthogonal to a longitudinal axis of the filament, where the core portion is an inner portion relative to the shell portion. Unless otherwise stated, these terms are not intended to imply any further limitations on the cross-sectional characteristics of the portions.

The term "3D part" refers to any object built using an extrusion-based additive manufacturing technique and includes parts and support structures that are printed using extrusion-based additive manufacturing techniques.

The term "tow" refers to a length of fine reinforcement fibers, between about 0-10 microns in diameter, that are continuous and unchopped, unbraided. The material can include any suitable fibers such as, but not limited to, carbon fiber, glass fiber, basalt, cotton, aramid fibers such as those sold under the KEVLAR® trademark, high density polyethylene (HDPE), thermoplastic materials that do not melt or flow at extrusion processing conditions and combinations thereof. The tow material is provided in fiber bundles or counts. Exemplary fiber tow bundles range from about 1,000 fibers to about 25,000 fibers.

The term "comingled tow" refers to tow material comingled with strands or fibers of thermoplastic material.

The terms "braid", "braided", and "braiding" refer to weaving together a plurality of strands of material, or a plurality of strands of material that have been woven together into a desired configuration for a consumable feedstock, including a substantially cylindrical configuration, and non-cylindrical configurations having an aspect ratio greater than 1:1. The weaving can be in any suitable design or pattern using any number of strands provided that the consumable material has a suitable shape and elastic modulus to be processed as a filament consumable in an additive manufacturing system.

The terms "about" and "substantially" are used herein with respect to measurable values and ranges due to expected variations known to those skilled in the art (e.g., limitations and variabilities in measurements).

DETAILED DESCRIPTION

Figure 1:
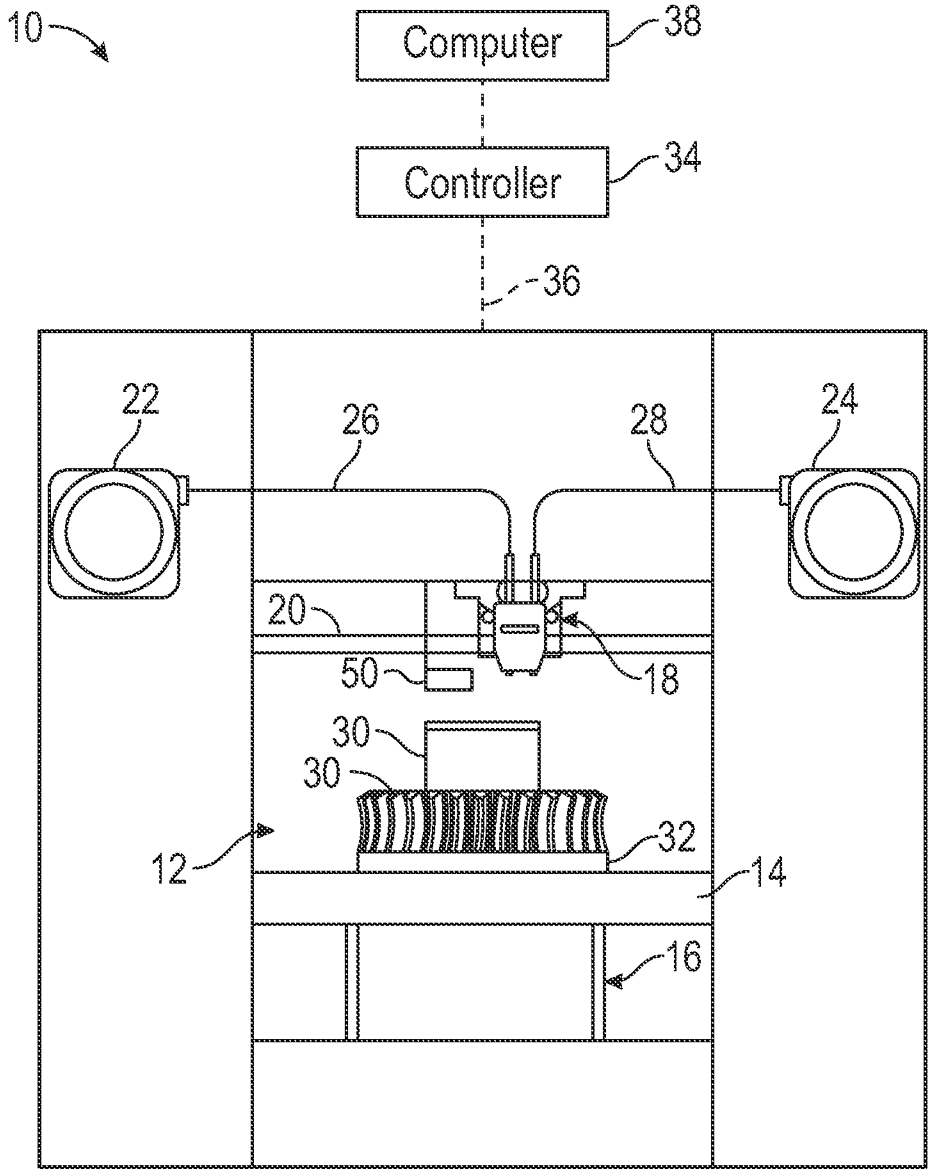
FIG. 1 is a front view of an exemplary additive manufacturing system configured to print 3D parts with the use of feedstock materials of the present disclosure.

The present disclosure is directed to a highly-loaded fiber-reinforced consumable filament feedstock for use in extrusion-based additive manufacturing systems. The filament feedstock is formed by braiding a plurality of strands of comingled tow material, wherein the comingled tow material is provided as a bundle having a selected fiber count and a selected volume percent of reinforcement tow material fibers and a selected volume percent of thermoplastic material fibers, and wherein each of the fiber material types are a provided as very thin wispy fibers. The fibers of reinforcement tow material comingled with the fibers of thermoplastic material is referred to herein as "comingled tow" material, as defined in the Definitions section.

The highly loaded fiber-reinforced consumable filament feedstock has a sufficient amount of thermoplastic fibers to wet or bind the tow material within an extruded bead of a 3D printed part, while also being capable of creating a strong bond with a previously extruded bead or layer. The fiber-reinforced consumable filament feedstock is capable of printing stronger, end use parts relative to other material feedstocks. This is due to the intimate contact between the thermoplastic material and the tow material and the high loading of reinforcement fibers in the filament. Highly-loaded feedstocks of the prior art typically do not flow or melt sufficiently in an extruder to wet the tow material, and thus are not suitable for printing strong end-use parts.

In one embodiment, the filament of the present disclosure is formed by braiding twisted strands of bundles of commingled tow material into a filament (as defined in the Definitions section). In some embodiments, the twisted strands of bundles are of the same commingled tow material. In some embodiments, the twisted strands of bundles of are of different commingled tow material.

In another embodiment, a filament having a core/shell configuration and having selected volume percents of tow material and thermoplastic material is utilized, where the braided tow material is substantially within the core portion. The shell has minimal amounts or no tow material extending to the surface of the filament.

Whether using twisted strands of commingled fibers or the core/shell configuration, the filaments of the present disclosure overcome many typical processing issue that make printing with tow material difficult, such as wear on the drive components. Further, when typical tow material is processed, small pieces of the tow material can break from the bundle. This results in the tow material becoming wound around moving parts, commonly referred to as "frizzing."

The size of the fibers of the tow material, which can resemble wispy strands or hairs, make the surface area to volume ratio very high, which results in the filament having a very high loading of reinforcement fiber, such as, for instance, up to 70 volume percent based upon the total volume of the filament. The volume percent loading of the filament with tow material translates to the volume percent loading of the part being printed, which is much higher than other additive manufacturing techniques. By way of example, printing parts with tapes of carbon fiber produce parts with up to about 50 volume percent loading.

Utilizing a highly filled, braided filament of commingled tow material overcomes many processing issues in an extrusion based additive manufacturing system. It is difficult to pull typical filament loaded with carbon fiber from a supply and drive the material into a liquefier tube due to the erosive nature of carbon fiber.

The present disclosure is also directed to a method forming a braided filament of strands of twisted bundles of commingled tow material. The commingled tow material is selected to have a desired material of tow and a desired thermoplastic material. The commingled tow material is provided in a bundle with a selected count of fibers, selected volume percent of tow material and a selected volume percent of thermoplastic material. The bundles are twisted to form strands of a selected diameter. A plurality of stands is used to braid a filament of a selected configuration with a selected braiding pattern.

In some embodiments, the braided tow material is utilized within a core of a core/shell configured filament. The filament is formed by coextruding a core portion with the braided commingled tow material substantially within the interior of the filament, where a shell at least partially surrounds the core. The coextrusion process places a significant amount of pressure on the braided commingled tow material, such that molten thermoplastic material enters the voids within the braided commingled tow material and wets or binds with the tow material, such that the filament is substantially free of voids.

The coextrusion process overcomes typical issues with wetting or binding the thermoplastic material to the fiber. However, prior to braiding the strands of commingled tow material, the tow material could be chemically treated using sizing chemicals to aid in the adherence of the thermoplastic material to the tow material, whether used as a braided filament or a core/shell filament.

The braided commingled tow material, for use as a 3D printing filament, may optionally be processed through a heated sizing die to size the filament to a selected feedstock shape and dimension. In other embodiments, the braided filament of commingled tow material can be processed through a die, such as a calendaring die, to produce a flat ribbon tape with a higher carbon fiber density relative to typical carbon fiber tape. When processed through the sizing die or the calendaring die, the thermoplastic material will typically be melted or heated to a temperature where the thermoplastic flows or melts and then re-solidifies upon cooling. The sized braided filament or tape may be then used as a feedstock in a 3D printer or, optionally, coextruded with a thermoplastic to form a filament having a core/shell configuration.

The commingled tow material can be customized to order based upon the count or density of the fiber and the amount of thermoplastic material to be comingled with the tow material. For instance, carbon fiber tow material in the range of 1,000 strands and about 24,000 strands are commercially available from Concordia Manufacturing LLC located in Coventry, RI.

In some of the core/shell filament embodiments, the thermoplastic material of the core or interior portion of the filament is the same as the shell material such that an interface between the core and the shell are not clearly defined. In other embodiments of the core/shell filament, the core is a different thermoplastic material than that of the outer surface, such that the filament has better defined core/shell configuration.

In some instances when utilizing a core/shell configured filament, it is advantageous to utilize a lower cost core material relative to a more expensive shell material that are substantially miscible with each other to reduce the costs of the filament and the cost of the part. The flow from an extrusion based additive manufacturing print head is laminar such that the extruded material retains the core/shell configuration. As such, a less expensive core material can be utilized while the shell material provides the desired mechanical properties, such as for instance, resistance to chemicals.

By way of non-limiting example, a core/shell configured filament can be constructed of a core of commingled, braided tow material, such as carbon fiber, with polyetherimide (PEI) such as Ultem® where the shell is polyetheretherketone (PEEK). When the part is printed, the part has the physical characteristics of a highly filled PEEK material, while the cost is reduced due to the use of the less expensive PEI.

In other embodiments of the core/shell filament, the thermoplastic materials in the core and shell can be substantially immiscible. The immiscibility of the thermoplastic materials in the core and the shell can provide lesser bonding between the layers and or the core and the shell to provide a desired weakened structural strength of the printed part.

FIG. 1 is a schematic front view of an exemplary additive manufacturing system 10 which may be used with a highly filled filament having a continuous length of a filament with a braided filament of strands of commingled tow material, according to an embodiment of the present disclosure. As shown in FIG. 1, system 10 is an extrusion-based additive manufacturing system for printing or otherwise building 3D parts and support structures using a layer-based, additive manufacturing technique, where the 3D part can be printed from part material and support structures can be printed from support material. Suitable extrusion-based additive manufacturing systems for system 10 include fused deposition modeling systems developed by Stratasys, Inc., Eden Prairie, MN under the trademark "FDM".

In the illustrated embodiment, system 10 includes chamber 12, platen 14, platen gantry 16, an extrusion head or print head 18, head gantry 20, and consumable assemblies 22 and 24. Chamber 12 is an enclosed environment that contains platen 14 and any printed parts. Chamber 12 can be heated (e.g., with circulating heated air) to reduce the rate at which the part and support materials solidify after being extruded and deposited. In alternative embodiments, chamber 12 can be omitted and/or replaced with different types of build environments. For example, parts can be built in a build environment that is open to ambient conditions or may be enclosed with alternative structures (e.g., flexible curtains).

Platen 14 is a platform on which printed parts and support structures are printed in a layer-by-layer manner. In some embodiments, platen 14 may also include a flexible polymeric film or liner on which the printed parts and support structures are printed. In the illustrated example, print head 18 is a dual-tip extrusion head configured to receive consumable filaments from consumable assemblies 22 and 24 (e.g., via feed tube assemblies 26 and 28) for printing 3D part 30 and support structure 32 on platen 14. Consumable assembly 22 may contain a supply of a part material, such as a high-performance part material, for printing printed part 30 from the part material. Consumable assembly 24 may contain a supply of a support material for printing support structure 32 from the given support material.

Platen 14 is supported by platen gantry 16, which is a gantry assembly configured to move platen 14 along (or substantially along) a vertical z-axis. Correspondingly, print head 18 is supported by head gantry 20, which is a gantry assembly configured to move print head 18 in (or substantially in) a horizontal x-y plane above chamber 12. In an alternative embodiment, platen 14 may be configured to move in the horizontal x-y plane within chamber 12 and print head 18 may be configured to move along the z-axis. Other similar arrangements may also be used such that one or both of platen 14 and print head 18 are moveable relative to each other over a desired number of degrees of freedom. Platen 14 and print head 18 may also be oriented along different axes. For example, platen 14 may be oriented vertically and print head 18 may print printed part 30 and support structure 32 along the x-axis or the y-axis.

The print head 18 can have any suitable configuration. Examples of suitable devices for print head 18, and the connections between print head 18 and head gantry 20 include those disclosed in Crump et al., U.S. Pat. No. 5,503,785; LaBossiere, et al., U.S. Pat. Nos. 7,384,255 and 7,604,470; Leavitt, U.S. Pat. No. 7,625,200; Batchelder et al., U.S. Pat. No. 7,896,209; Comb et al., U.S. Pat. No. 8,153,182; Leavitt, U.S. Pat. No. 7,625,200; Swanson et al., U.S. Pat. Nos. 8,419,996 and 8,647,102; Batchelder U.S. Pat. No. 8,926,882; and Barclay et al. U.S. Published Patent Application 20180043627. In one example, during a build operation, one or more drive mechanisms, such as drive mechanism 19, are directed to intermittently feed the modeling and support materials (e.g., consumable filaments via feed tube assemblies 26 and 28) through print head 18 from supply sources 22 and 24.

System 10 also includes controller 34, which can include one or more control circuits configured to monitor and operate the components of system 10. For example, one or more of the control functions performed by controller 34 can be implemented in hardware, software, firmware, and the like, or a combination thereof. Controller 34 can communicate over communication line 36 with chamber 12 (e.g., with a heating unit for chamber 12), print head 18, and various sensors, calibration devices, display devices, and/or user input devices.

System 10 and/or controller 34 can also communicate with computer 38, which can include one or more discrete computer-based systems that communicate with system 10 and/or controller 34, and may be separate from system 10, or alternatively may be an internal component of system 10. Computer 38 includes computer-based hardware, such as data storage devices, processors, memory modules, and the like for generating and storing tool path and related printing instructions. Computer 38 may transmit these instructions to system 10 (e.g., to controller 34) to perform printing operations.

A digital model representative of a 3D part to be printed can be created, such as by scanning an existing 3D object to create a digital image file, or such as by drawing a 3D model using a computer-aided design (CAD) program. The digital model and/or instructions for printing the model can be loaded into computer 38. The computer 38 can communicate with controller 34, which serves to direct the system 10 to print the 3D part 30 and optionally, a support structure 32. Part material is deposited in layers along toolpaths that build upon one another to form the 3D part 30.

Once a layer has been printed, a severing tool 50 is utilized to sever the tow material such that a next layer can be printed. The severing tool 50 is illustrated schematically and can include a mechanical cutter the physically severs the filament with the tow material. In another embodiment, the severing tool 50 can be a laser that is located proximate the system 10 or proximate the print head 18, where electromagnetic energy is emitted to ablate the thermoplastic material and the tow material to cause the filament to sever.

The printing and severing process is repeated in a layer by layer manner until the part is printed. In other embodiments, the toolpaths can be continuous in at least portions of the part to minimize the number of times that the tow material requires severing.

Figure 2:
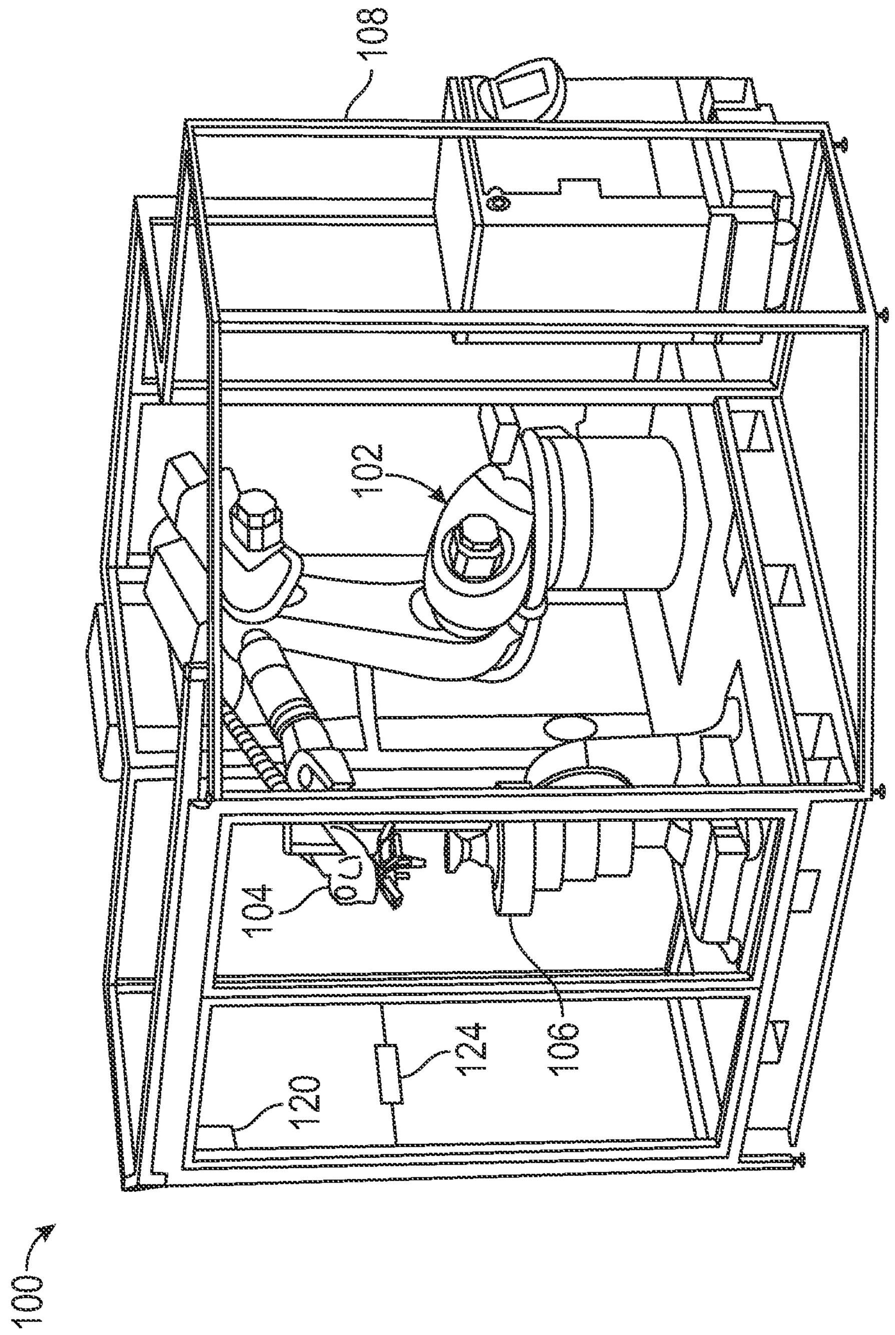
FIG. 2 is a schematic view of exemplary robotic additive manufacturing system configured to print parts with the use of feedstock materials of the present disclosure.

FIG. 2 is a perspective view of a multi-axis robotic build system 100 that may be used for building 3D parts utilizing two-dimensional tool paths, three-dimensional tool paths and combinations thereof. System 100 includes in one embodiment a robotic arm 102 capable of movement along six axes. An exemplary robotic arm is an industrial robot manufactured by KUKA Robotics of Augsburg, Germany. While six axes of motion are discussed for the robotic arm 102 from a stationary base, it should be understood that additional axes or other movements are also amenable to use with the embodiments of the present disclosure, without departing therefrom. For example, the robotic arm 102 could be mounted to move on a rail or a gantry to provide additional degrees of freedom. The robotic arm 102 carries a print head 104, such as, by way of example only and not by way of limitation, a print head similar to print head 18 described above, for printing parts from a filament feedstock. A build platform 106 is provided, which in one embodiment is movable along two axes of rotation, rotation about the z-axis, and tilting (rotation) about the x-axis. A controller 108 contains software and hardware for controlling the motion of the robotic arm 102 and the build platform 106, as well as the printing operation of the print head 104. The system 100 optionally may be housed within a build structure 120.

A generated tool path is utilized to control motion of the robotic arm 102. However, control of the extrusion head is also used to accurately deposit material along the generated tool path. For example, one embodiment of the present disclosure synchronizes timing of the motion of the robotic arm 102 with print head 104 to extrusion from the print head 104. Embodiments of the present disclosure provide for speed up or slowdown of printing, changing the extrusion rate in conjunction with robotic movements, tip cleaning, and other actions of the print head 104 based on the generated tool path and motion of the robotic arm 102. As an example, extrusion from the print head 104 may be synchronized with motion of the robotic arm 102 in manners taught by Comb et al. U.S. Pat. No. 6,054,077; and Comb U.S. Pat. Nos. 6,814,907, 6,547,995, and 6,814,907.

Once a tool path is completed, a severing tool 124 is utilized to sever the tow material such that a next tool path can be printed. The severing tool 50 is illustrated schematically and can include a mechanical cutter the physically severs the filament with the tow material. In another embodiment, the severing tool 50 can be a laser that is located proximate the system 100 or proximate the print head 104, where electromagnetic energy is emitted to ablate the thermoplastic material and the tow material to cause the filament to sever.

The printing and severing process is repeated in a tool path by tool path manner until the part is printed. In other embodiments, the toolpaths can be continuous in at least portions of the part to minimize the amount of severing of the tow material.

Figure 3:
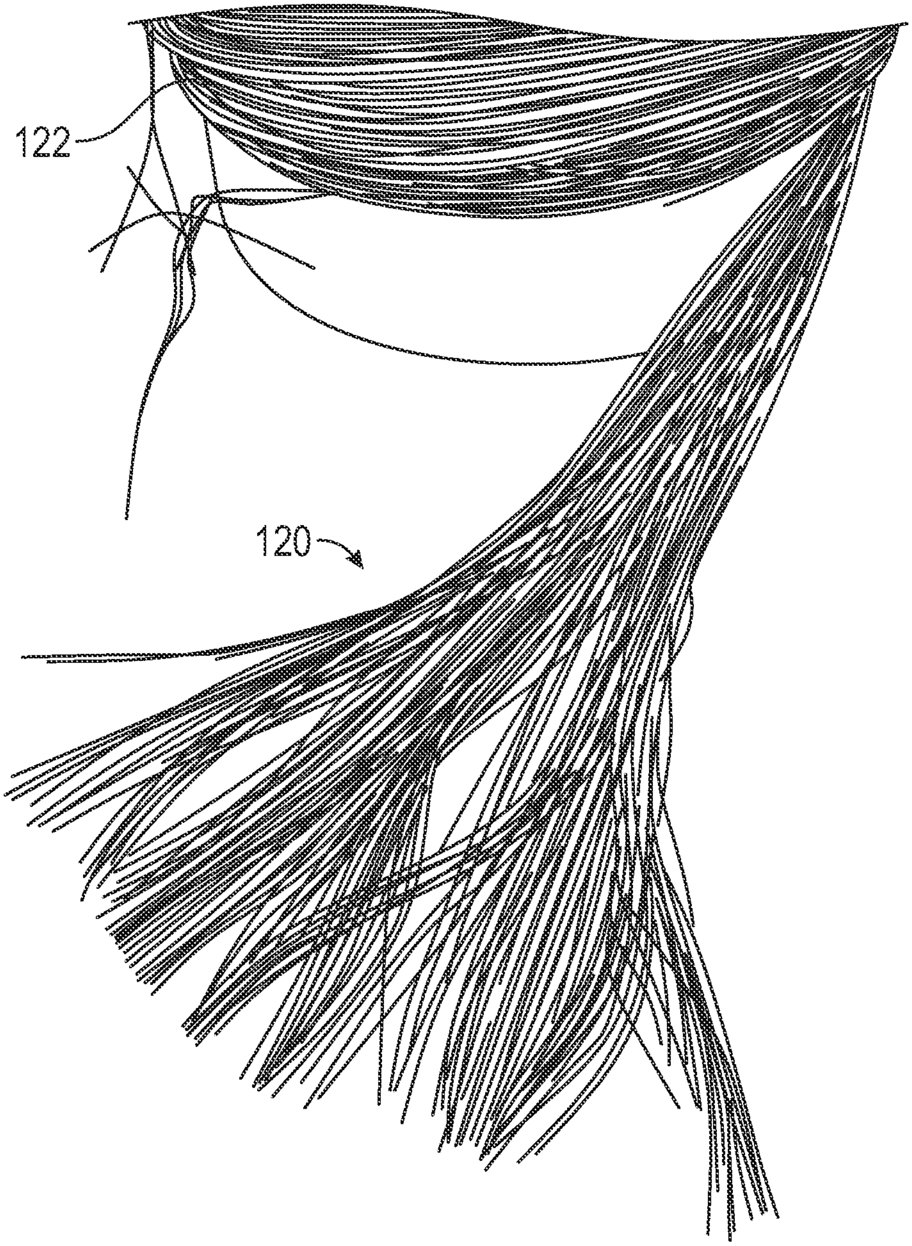
FIG. 3 is an illustration of a bundle of commingled tow material.

FIG. 3 illustrates a bundle 120 of commingled tow material being unwound from a roll 122 prior to being twisted and braided. FIG. 3 illustrates the wispy nature of the commingled tow material prior to being twisted into strands and braided into a filament.

Figure 4:
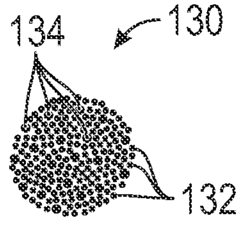
FIG. 4 is a cross-section of a strand of a bundle of commingled tow material.

FIG. 4 is a cross-sectional view of a strand of a bundle of commingled tow material. The strand 130 includes fibers 132 of tow material and fibers 134 of thermoplastic material that are dispersed within the fibers 132 of tow material. Dispersing the fibers 134 of thermoplastic material with the fibers 132 of the tow material increases the ability to wet the fibers 132 of the tow material to increase the strength of a part being printed by the system 10 or 100.

Figure 5:
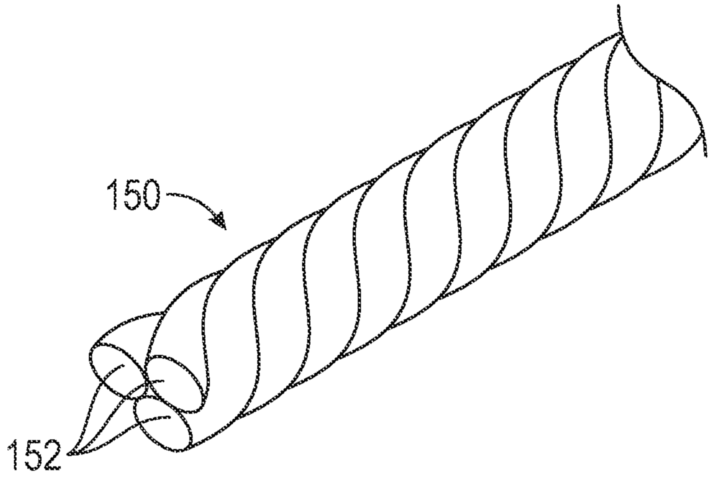
FIG. 5 is a perspective view of a braided comingled tow filament feedstock of the present disclosure having a substantially cylindrical configuration.

Referring to FIG. 5, a substantially cylindrical filament is illustrated at 150. The filament 150 is formed by braiding a plurality of twisted strands 152 of comingled tow fibers. The filament 150 has the selected volume percent and materials of tow material and the selected volume percent and material of thermoplastic material. A plurality of strands 152 are then braided together to form the substantially cylindrical filament 150.

Figure 6:
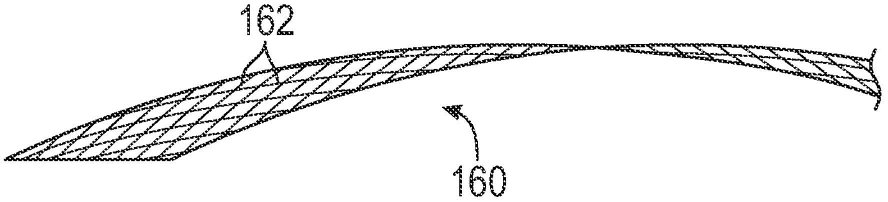
FIG. 6 is a perspective view of a braided comingled tow filament feedstock of the present disclosure, configured as a ribbon filament.

The filament 150 is configured to be fed to an additive manufacturing system 10 or 100 where the thermoplastic based strands are in a solid form. The filament 150 is fed into a liquefier where heat is imparted into the filament 150 to cause amorphous thermoplastic material strands to flow or semi-crystalline thermoplastic material to melt. The comingled and intertwined spatial relationship between the thermoplastic fibers and the tow material fibers causes the flowing or melted thermoplastic material to substantially wet and bond with the tow material and, also provide a sufficient amount of thermoplastic material on the exterior surface of the heated filament 150 to allow layers of filament 150 to be bonded together to print a part. Referring to FIG. 6, another braided filament is illustrated at 160. The filament 160 is similar the filament 150 and is formed of a plurality of strands 162 of comingled tow material that are twisted into the strands 162. The comingled tow material is provided with a selected count and a selected volume percent of tow material and a selected volume percent thermoplastic fibers.

However, the plurality of strands 162 are braided or sized into a ribbon filament 160 having an aspect ratio greater than 1:1. The braided filament 160 typically has an aspect ratio ranging from about 2:1 to about 20:1 and more particularly from about 2:1 to about 5:1.

The filament 160 is configured to be fed to an additive manufacturing system where the thermoplastic based strands are in a solid form.

The filament 160 is fed into a liquefier where heat is imparted into the filament to cause amorphous thermoplastic material to flow or semi-crystalline thermoplastic material to melt. The comingled and intertwined spatial relationship between the thermoplastic fibers and the tow material fibers causes the flowing or melted thermoplastic material to substantially wet and bond with the tow material and, also provides sufficient amounts of thermoplastic material on the exterior surface of the heated filament to allow layers of filament to be bonded together.

Figure 7:
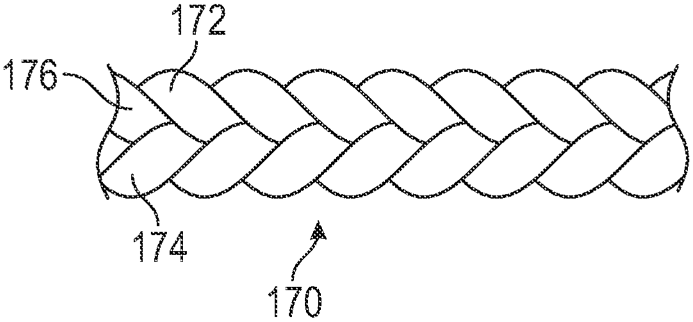
FIG. 7 is a front view of another configuration of a braided comingled tow filament feedstock of the present disclosure

FIG. 7 is another embodiment of a non-cylindrical filament 170 having a braid formed with three strands 172, 174 and 176 of commingled tow material. The filament 170 can be processed in the systems 10 and 100, similarly to the filament 160 to print parts.

After formation, filaments 150, 160 and 170 may be wound onto a spool or be otherwise packaged for use with system 10 or 100.

Figure 8:
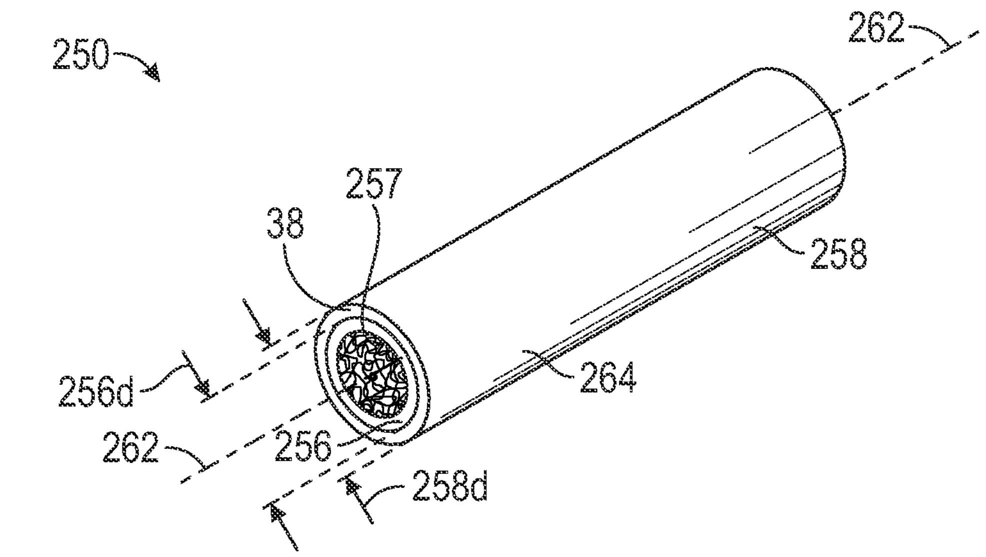
FIG. 8 is a perspective view of a segment of a core-shell braided comingled tow filament feedstock of the present disclosure having a round configuration, wherein the braided commingled tow forms the core portion.

FIG. 8 illustrates a segment of core-shell braided comingled tow filament 250 having a cylindrical geometry, wherein the braided comingled tow forms a core portion 256, and a shell portion 258*d* extends along length 260 encapsulating the core portion 256. Core portion 256 is located around central axis 262, and shell portion 258 is concentric with the core portion 256 and forms outer surface 264. Core portion 256 compositionally includes the braided, commingled tow material 256 and shell portion 258 compositionally includes a same or different thermoplastic material. The core-shell filament 250 may be manufactured by co-extruding the braided comingled tow filament with a thermoplastic provided as a molten flow of material, in manners know in the art. The core-shell configuration reduces abrasion on wear-parts that typically occurs when a fiber-loaded feedstock is fed through the additive manufacturing system to the extruder.

As mentioned above, the filament 250 may be manufactured with a co-extrusion process, where the core and shell materials may be separately compounded and co-extruded to form filament 250. While core portion 256 and shell portion 258 are illustrated in FIG. 8 as having a defined interface, it is understood that the core and shell materials may at least partially inter-diffuse at this interface due to the co-extrusion process and the miscibility of the materials. After formation, filament 250 may be wound onto a spool or be otherwise packaged for use with system 10 or 100.

When a cross-section of the cylindrical filament is taken substantially normal to the central axis, core portion 256 has an outer diameter referred to as core diameter 256*d*, and shell portion 258 has an outer diameter referred to as shell diameter 258*d*, where shell diameter 258*d* also corresponds to the outer diameter of filament 250. The relative dimensions for shell diameter 258*d* to core diameter 256*d* are desirably selected such that the amount of the shell material provides the necessary physical properties for the part while the core provides the strength of a highly loaded material, which includes up to about 70 volume percent of tow material based upon the volume of the filament.

While a circular cross-sectional geometry is illustrated in FIG. 8, other cross-sectional geometries are also within the scope of the present disclosure. Non-limiting cross-sectional configurations of filament geometries include non-cylindrical geometries including a substantially square cross-section, rectangular cross-section, elliptical cross-section or obround cross-section when taken along a plane substantially normal to the longitudinal axis.

Figure 9:
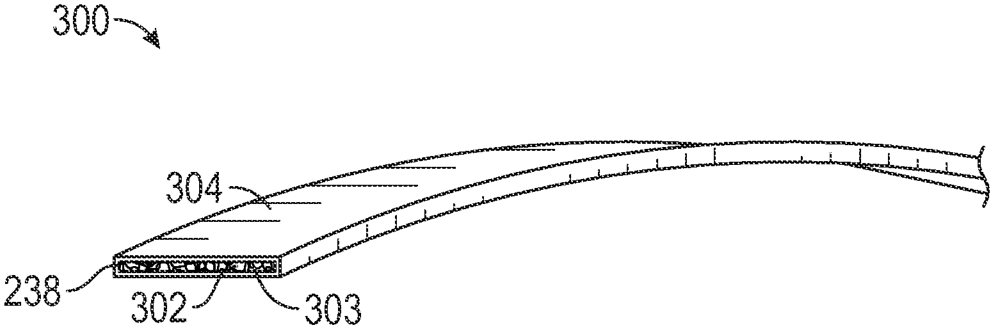
FIG. 9 is a perspective view of a segment of core-shell braided comingled tow filament feedstock of the present disclosure having a ribbon configuration, wherein the braided commingled tow forms the core portion.

For example, as shown in FIG. 9, filament 300 has a core/shell configuration similar to filament 250, as illustrated in FIG. 3. As illustrated in FIG. 9, filament 300 has a non-cylindrical cross-sectional geometry wherein braided commingled tow material 303 forms the a core portion 302, and a shell portion 304 may be formed of a thermoplastic material that is the same as or different from the thermoplastic fibers provided in the commingled tow. The filament 300 has a rectangular cross-sectional geometry, a format referred to a ribbon filament, and in exemplary embodiments has an aspect ratio ranging from about 2:1 to about 20:1 and more particularly from about 2:1 to about 5:1.

Figure 10:
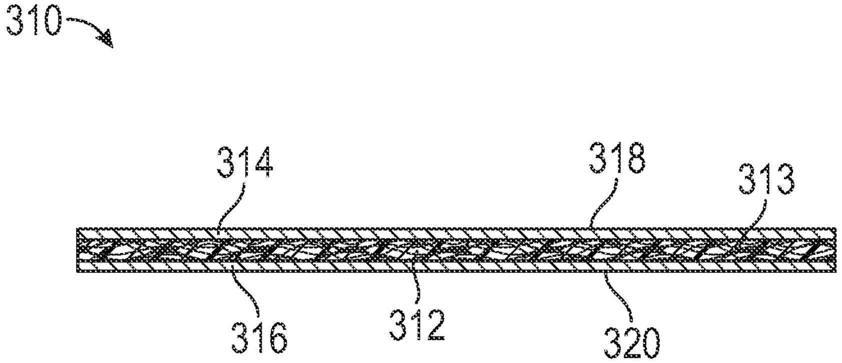
FIG. 10 is a perspective view of a segment of a layered or "sandwich" braided comingled tow filament feedstock of the present disclosure, wherein the braided commingled tow forms an interior layer of the feedstock.

FIG. 10 illustrates a segment of a layered braided comingled tow filament feedstock according to the present invention, shown as filament 310, and referred to as a "sandwich" configuration. As shown, filament 310 has a rectangular cross-sectional profile with an aspect ratio greater than 1:1, although other variations are included in the scope of the invention, including square profiles. The braided commingled tow forms an interior layer of the feedstock, shown as middle portion 312. Thermoplastic material is bonded to the longer sides surfaces 314 and 316 in layers 318 and 320, respectively. The layers 318 and 320 are configured to be engaged by a drive mechanism, such that the drive mechanism engages substantially thermoplastic material which extends the life of the drive mechanism, as previously explained. The filament 310 has an aspect ratio ranging from about 2:1 to about 20:1 and more particularly from about 2:1 to about 5:1.

With each disclosed filament, the comingled and intertwined spatial relationship between the thermoplastic fibers and the tow material fibers causes the flowing or melted thermoplastic material to substantially wet and bond with the tow material and also provides sufficient amounts of thermoplastic material on the exterior surface of the heated filament to allow layers of filament to be bonded together Optionally, prior to comingling of the fibers, the reinforcement fibers of the tow material and/or the thermoplastic fibers may be treated with one or more surface treatments, such as are known to persons skilled in the art, to aid the wetting or bonding between the fiber materials.

As discussed above, the feedstock of the present disclosure is a highly filled filament that can be processed through an extrusion based additive manufacturing system at volume percents of filled material that are not possible with filament feedstock of the current art Although the filaments 150, 160, 170, 250, 300 and 310 may have different configurations the volume percent of the tow material and the thermoplastic material may be substantially consistent based upon the volume percent of the thermoplastic fibers comingled with the tow material and the volume percent of the thermoplastic material without the tow material, where the thermoplastic layer is in the core, the shell, the inner layer or the outer layers. If the feed stock is that only of braided comingled tow material such as the filaments 150, 160 and 170, the volume percent thermoplastic fibers comingled in the tow material is adjusted to the selected volume percent of the filament 250, 300 and 310. If a thermoplastic layer(s) is utilized along with the braided comingled tow material such as in filaments 250, 300 and 310, then the volume percent of the thermoplastic strands within the comingled tow material can be adjusted to provide the filament with the desired volume percent of the thermoplastic-based material and the tow material. When utilizing comingled tow material, the thermoplastic strands and/or the strands of the reinforcing tow material can be treated with a sizing chemical or composition to aid the wetting or bonding of the thermoplastic material to the tow material.

In other embodiments, the configuration of the filaments 250, 300 and 310 can be utilized to provide a filament with a higher or lower volume percent of the tow material therein. Also, the thermoplastic-based material comingled in the comingled tow material and additional portions or layers of the filaments 250, 300 and 310 may be the same or different. Further the different thermoplastic materials may be miscible with each other to enhance bonding between layer or immiscible to weaken the bond between layers depending upon desired properties of the part.

The volume percent of the tow material in the feedstocks 150, 160, 170, 250, 300, and 310 ranges from about 50 to 75 volume percent and the volume percent of the thermoplastic material ranges from about 25 volume percent to about 50 volume percent. More particularly, the volume percent of the tow material in the filaments 150, 160, 170, 250, 300 and 310 ranges from about 55 to 70 volume percent and the volume percent of the thermoplastic material ranges from about 30 volume percent to about 45 volume percent. More particularly, the volume percent of the tow material in the filaments 150, 160, 170, 250, 300 and 310 ranges from about 60 to 70 volume percent and the volume percent of the thermoplastic material ranges from about 30 volume percent to about 40 volume percent. One exemplary commingled to material is carbon fiber commingled with polyetherimide (PEI).

Although the present disclosure has been described with reference to several embodiments, workers skilled in the art will recognize that changes may be made in form and detail without departing from the spirit and scope of the disclosure.

The invention claimed is:

1. A coextruded core-shell configured filament for use in an extrusion based additive manufacturing system, the filament having a longitudinal axis, the filament comprising:

a core comprising comingled tow material comprising at least three individually twisted strands wherein the at least three individually twisted strands are braided together, the commingled tow material having a fiber density ranging from about 1,000 fibers to about 25,000 fibers having thermoplastic fibers comingled therewith; and a shell comprising a thermoplastic material that at least partially surrounds the core, wherein the tow material in the filament ranges from about 50 to 75 volume percent of the filament and the thermoplastic material in the filament ranges from about 25 volume percent to about 50 volume percent of the filament, wherein during the coextrusion process the thermoplastic material of the shell and the thermoplastic fibers in commingled tow material becomes molten and enters the voids within the braided comingled tow material such that the filament is substantially free of voids prior to being deposited to form a portion of a 3D part with the extrusion based additive manufacturing system.

2. The filament of claim 1, wherein the filament has a substantially circular cross-section when taken along a plane substantially normal to the longitudinal axis and wherein the shell substantially surrounds the core such that substantially no tow material extends through an outer surface of the shell.

3. The filament of claim 1, wherein the filament has a substantially square cross-section, rectangular cross-section, elliptical cross-section or obround cross-section when taken along a plane substantially normal to the longitudinal axis, wherein the filament with the rectangular cross-section, elliptical cross-section or obround cross-section has an aspect ratio ranging from about 2:1 to about 20:1 when taken along a plane substantially normal to the longitudinal axis and wherein the shell substantially surrounds the core such that substantially no tow material extends through an outer surface of the shell.

4. The filament of claim 1, wherein the filament has a substantially square cross-section, rectangular cross-section, elliptical cross-section or obround cross-section when taken along a plane substantially normal to the longitudinal axis, wherein the filament with the rectangular cross-section, elliptical cross-section or obround cross-section has an aspect ratio ranging from about 2:1 to about 20:1 when taken along a plane substantially normal to the longitudinal axis and wherein the shell is located on opposing sides of the core.

5. The filament of claim 1, wherein the comingled tow material is treated with sizing chemicals prior to being braided.

6. The filament of claim 1, wherein the tow material in the filament ranges from about 55 to 70 volume percent and the thermoplastic material in the filament ranges from about 30 volume percent to about 45 volume percent.

7. The filament of claim 1, wherein the thermoplastic material in the shell is substantially miscible with the thermoplastic fibers in the core.

8. The filament of claim 1, wherein the thermoplastic material in the shell is substantially immiscible with the thermoplastic fibers in the core.

9. A method of printing a part with an extrusion based additive manufacturing system, the method comprising:

providing a coextruded core-shell configured filament having a core comprising strands of at least three twisted strands tow material that are braided together with a longitudinal axis and having a fiber density ranging from about 1,000 fibers to about 25,000 fibers having thermoplastic fibers comingled therewith, and a shell that at least partially surrounds the braided tow material and wherein the shell comprises a thermoplastic material, wherein the comingled tow material in the filament ranges from about 50 to 75volume percent of the filament and the thermoplastic material ranges from about 25 volume percent to about 50 volume percent of the filament, wherein during the coextrusion process the thermoplastic material of the shell and the thermoplastic fibers in commingled tow material becomes molten and enters the voids within the braided comingled tow material such that the filament is substantially free of voids as a feedstock to a liquefier;

heating the core-shell configured filament in the liquefier such that the thermoplastic material within the filament is heated to a flowing or melted state; and extruding the filament from the liquefier along a first tool path to form at least a portion of the part wherein the thermoplastic material bonds to the tow material and provides a sufficient amount of thermoplastic material on a surface of the extruded filament such that layers of the filament bond to each other to print at least a portion of the part.

10. The method of claim 9, and further comprising severing the filament proximate an end of the first tool path.

11. The method of claim 10, and further comprising repeating the heating, extruding and severing steps until the part is printed.

12. The method of claim 9, wherein the filament has a substantially circular cross-section when taken along a plane substantially normal to the longitudinal axis and wherein the shell substantially surrounds the core such that substantially no tow material extends through an outer surface of the shell.

13. The method of claim 9, wherein the filament has a substantially square cross-section, rectangular cross-section, elliptical cross-section or obround cross-section when taken along a plane substantially normal to the longitudinal axis, wherein the filament with the rectangular cross-section, elliptical cross-section or obround cross-section has an aspect ratio ranging from about 2:1 to about 20:1 when taken along a plane substantially normal to the longitudinal axis and wherein the wherein the shell substantially surrounds the core such that substantially no tow material extends through an outer surface of the shell.

14. The method of claim 9, wherein the filament has a substantially square cross-section, rectangular cross-section, elliptical cross-section or obround cross-section when taken along a plane substantially normal to the longitudinal axis, wherein the filament with the rectangular cross-section, elliptical cross-section or obround cross-section has an aspect ratio ranging from about 2:1 to about 20:1 when taken along a plane substantially normal to the longitudinal axis and wherein the wherein the shell is located on opposing surfaces of the core.

15. The method of claim 9 and further comprising treating the tow material with a sizing chemical prior to braiding.

16. The method of claim 9 and further comprising processing the strands through a sizing die to configure the strands in a selected shape and or dimension prior to braiding.

17. The method of claim 9 and further comprising processing the strands through a calendaring die to form the strands into a flat ribbon or tape prior to braiding.

18. The method of claim 9 and further comprising processing the strands having a first cross-sectional area through a calendaring die such that the strands have a second cross-sectional area, wherein the second cross-sectional area is less than the first cross-sectional area.

19. The filament of claim 9, wherein the tow material in the filament ranges from about 55 to 70 volume percent and the thermoplastic material in the filament ranges in the core from about 30 volume percent to about 45 volume percent.

* * * * *